(12) United States Patent
Sakata et al.

(10) Patent No.: US 8,790,095 B2
(45) Date of Patent: Jul. 29, 2014

(54) ELECTRIC PUMP UNIT

(75) Inventors: Takatoshi Sakata, Yamatotakada (JP);
Akihiko Kawano, Kashiwara (JP);
Hiroki Kagawa, Kashiba (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 277 days.

(21) Appl. No.: 12/998,362

(22) PCT Filed: Oct. 14, 2009

(86) PCT No.: PCT/JP2009/067773
§ 371 (c)(1),
(2), (4) Date: Apr. 13, 2011

(87) PCT Pub. No.: WO2010/044416
PCT Pub. Date: Apr. 22, 2010

(65) Prior Publication Data
US 2011/0194954 A1 Aug. 11, 2011

(30) Foreign Application Priority Data

Oct. 14, 2008 (JP) ............................. P2008-264791
Nov. 7, 2008 (JP) ............................. P2008-286668
Mar. 31, 2009 (JP) ............................. P2009-084436

(51) Int. Cl.
*F04B 35/04* (2006.01)
(52) U.S. Cl.
USPC .................................. 417/423.7; 417/423.12
(58) Field of Classification Search
USPC .............. 417/423.1, 423.7, 423.12
See application file for complete search history.

(56) References Cited

U.S. PATENT DOCUMENTS

| 4,134,712 | A | * | 1/1979 | Kemmner et al. ....... 417/423.12 |
| 5,733,106 | A | | 3/1998 | Lee |
| 5,810,568 | A | | 9/1998 | Whitefield et al. |
| 6,030,187 | A | | 2/2000 | Whitefield et al. |

(Continued)

FOREIGN PATENT DOCUMENTS

| CN | 1142015 A | 2/1997 |
| CN | 1285898 A | 2/2001 |

(Continued)

OTHER PUBLICATIONS

Japanese Notification of Reasons for Refusal dated Sep. 10, 2013, with English-language translation.

(Continued)

*Primary Examiner* — Charles Freay
*Assistant Examiner* — Patrick Hamo
(74) *Attorney, Agent, or Firm* — McGinn IP Law Group, PLLC

(57) ABSTRACT

An electric pump unit includes: a unit housing; a bearing unit provided within the unit housing; a rotary portion; and a motor stator fixed to the unit housing. The rotary portion includes: a pump driving motor shaft supported by the bearing unit such that an axial position of a center of gravity of the rotary portion falls within an axial range of the bearing unit, and a motor rotor. The motor rotor includes: a disc portion which extends radially outwards from an axial end portion of the motor shaft; and a cylindrical portion which extends from an outer circumferential portion of the disc portion towards the other axial end side and surrounds an outer circumference of the bearing unit.

9 Claims, 4 Drawing Sheets

(56) References Cited

U.S. PATENT DOCUMENTS

| | | | |
|---|---|---|---|
| 6,089,834 A | 7/2000 | Ozu et al. | |
| 6,428,291 B1 | 8/2002 | Baerlin et al. | |
| 6,499,966 B1 | 12/2002 | Werson et al. | |
| 6,585,498 B2 * | 7/2003 | Arbogast et al. | 417/423.1 |
| 8,038,417 B2 * | 10/2011 | Yamamoto et al. | 417/310 |
| 2005/0012387 A1 | 1/2005 | Suzuki et al. | |
| 2005/0201861 A1 | 9/2005 | Yoshida et al. | |
| 2005/0201864 A1 | 9/2005 | Yoshida et al. | |
| 2005/0244284 A1 | 11/2005 | Kolb | |
| 2006/0101817 A1 | 5/2006 | Fukutomi et al. | |
| 2007/0252451 A1 | 11/2007 | Shibuya et al. | |
| 2008/0107552 A1 | 5/2008 | Fujii | |

FOREIGN PATENT DOCUMENTS

| | | |
|---|---|---|
| CN | 1626813 A | 6/2005 |
| JP | S55-023343 A | 2/1980 |
| JP | 60-149892 | 10/1985 |
| JP | S61-176952 U | 11/1986 |
| JP | 63-117256 | 7/1988 |
| JP | 2-23280 | 1/1990 |
| JP | 6-346874 | 12/1994 |
| JP | 9-507892 | 8/1997 |
| JP | 11-132171 | 5/1999 |
| JP | 2001-166246 | 6/2001 |
| JP | 2002-522696 | 7/2002 |
| JP | 2002-238207 | 8/2002 |
| JP | 2002-257053 | 9/2002 |
| JP | 2003-529019 | 9/2003 |
| JP | 2004-80937 | 3/2004 |
| JP | 2004-222342 A | 8/2004 |
| JP | 2004-353536 | 12/2004 |
| JP | 2005-245199 A | 9/2005 |
| JP | 2005-256705 A | 9/2005 |
| JP | 2005-256706 | 9/2005 |
| JP | 2005-315188 | 11/2005 |
| JP | 2005-337025 | 12/2005 |
| JP | 2006-52652 | 2/2006 |
| JP | 2006-262611 | 9/2006 |
| JP | 2006-274921 | 10/2006 |
| JP | 2006-291734 | 10/2006 |
| JP | 2007-270678 | 10/2007 |
| JP | 2007-300741 | 11/2007 |
| JP | 2008-92759 | 4/2008 |
| JP | 2008-115747 | 5/2008 |
| JP | 2008-175188 A | 7/2008 |

OTHER PUBLICATIONS

Chinese Office Action dated May 30, 2013, with English-language translation.
Japanese Office Action dated Jan. 22, 2014 with an English Translation.
Japanese dated May 13, 2014, with English translation.

* cited by examiner

ELECTRIC PUMP UNIT

TECHNICAL FIELD

The present invention relates to an electric pump unit for use as an automotive hydraulic pump, for example.

BACKGROUND ART

In recent years, as automotive hydraulic pumps, with a view to saving energy by controlling starts and stops of a hydraulic pump minutely and ensuring the supply of oil pressure to a driving system such as a transmission even while the engine is being stopped due to the "idling stop," more electric pump units have been in use.

Since an automotive electric pump is installed in a limited space within a vehicle body, compactness is required, and additionally, light weight and low cost are also required. As an electric pump unit which can meet such requirements, there has been proposed an automotive electric pump in which an electric motor and a pump are integrally incorporated within a common unit housing (refer to Patent Document 1, for example).

In addition, as an electric pump unit which can meet the requirements, there has been proposed an automotive electric pump unit in which a pump, an electric motor and a motor controller are integrally incorporated within a common unit housing (refer to Patent Document 2, for example).

RELATED ART DOCUMENTS

Patent Documents

Patent Document 1: JP-A-2006-274921
Patent Document 2: JP-A-2006-262611

SUMMARY OF THE INVENTION

Problem to be solved by the Invention

The electric pump unit described in Patent Document 1 above is such that a pump driving motor shaft is supported at two axial locations thereon by two rolling bearings which are disposed within a unit housing and a motor rotor is formed at a portion situated between these bearings.

Since this electric pump unit is constructed so that the bearings are disposed on both sides of the motor rotor, the length of the motor shaft is increased accordingly, which limits the attempt to make compact the electric pump unit. In addition, although one of the bearings can be supported within a cylindrical portion which is formed integrally on a pump housing which makes up the unit housing, a member is necessary which supports the other bearing, and hence the number of components is increased, which becomes a factor which disturbs a further reduction in weight and cost.

In the electric pump unit described in Patent Document 2 above, a pump driving motor shaft is supported at two axial locations thereon by two rolling bearings which are disposed within a unit housing, a motor rotor is provided at a portion of the motor shaft which is situated between these bearings, and a motor stator is fixedly provided at a portion in the unit housing which lies on the periphery of the motor rotor. One of the bearings is provided in a cylindrical portion which is formed integrally on a pump housing which makes up the unit housing, and the other bearing is provided in a cylindrical portion which is formed integrally on a wall of a motor housing which makes up the unit housing. In addition, a controller compartment is formed in a portion of a wall of the pump unit which lies opposite to the motor rotor, and a substrate for the controller is disposed in the controller compartment. A component making up the controller which is short in height is disposed on a motor rotor side surface of the substrate, whereas components of the controller which are tall in height are disposed on an opposite surface of the substrate to the motor rotor side surface thereof.

Since this electric pump unit is constructed so that the rolling bearings are disposed on both sides of the motor rotor, the length of the motor shaft is increased accordingly, which limits the attempt to make compact the electric pump unit. In addition, since the motor compartment in the motor housing which accommodates the motor and the controller compartment are divided by the wall of the motor housing in the axial direction, the thickness of the substrate and the height of the components packaged in the substrate affect the length of the electric pump unit directly and the length of the electric pump unit is increased accordingly.

An object of the invention is to solve the problems and to provide an electric pump unit which can reduce the size, the weight and the cost thereof.

Means for Solving the Problem

According to one aspect of the invention, there is provided an electric pump unit including a unit housing; a bearing unit provided within the unit housing; a rotary portion including a pump driving motor shaft supported by the bearing unit such that an axial position of a center of gravity of the rotary portion falls within an axial range of the bearing unit, and a motor rotor including a disc portion which extends radially outwards from an axial end portion of the motor shaft and a cylindrical portion which extends from an outer circumferential portion of the disc portion towards the other axial end side and surrounds an outer circumference of the bearing unit; and a motor stator fixed to the unit housing.

Since the electric pump unit is configured such that the motor shaft is cantilevered so as to be supported at one axial location by the bearing unit and the motor rotor is provided so as to surround the outer circumference of the bearing unit, the length of the motor shaft can be kept short and hence can be made compact further in size. In addition, the axial position of the center of gravity of the rotary portion including the motor shaft and the motor rotor falls within the axial range of the bearing unit, the rotary portion can be supported rotatably in a stable fashion. The axial position of the center of gravity of the rotary portion is preferably at a central portion of the axial range of the bearing unit.

An electric motor constituting the electric pump unit is a DC brushless motor, for example. Brushless motors include a brushless motor in which a rotation angle (a rotational position) of a motor shaft is detected by a rotation angle sensor for control and a brushless sensor-free motor which uses no rotation angle sensor.

In the electric pump unit according to the aspect of the invention, for example, a rotor of the rotation angle sensor may be provided on an outer circumference of the motor shaft situated further radially inwards than the cylindrical motor rotor, and a stator of the rotation angle sensor may be provided on a portion on the unit housing which faces the rotor of the rotation angle sensor.

The rotation angle sensor is a resolver, for example.

Further, for example, the rotor of the rotation angle sensor may be provided on an outer circumference of the motor shaft situated further radially inwards than the cylindrical motor rotor, and the stator of the rotation angle sensor may be provided on an inner circumference of the cylindrical portion which faces the rotor of the rotation angle sensor.

With this configuration, the control of the electric motor can be implemented by detecting the rotation angle of the motor shaft by the rotation angle sensor. In addition, the increase in axial length of the electric pump unit can be suppressed so as to make the electric pump unit small in size by the configuration in which the rotor and the stator of the rotation angle sensor face each other in the radial direction.

According to another aspect of the invention, there is provided the electric pump unit according to the one aspect of the invention, wherein the motor stator protrudes further towards one axial end side than the motor rotor, wherein a substrate for the controller is fixed to one axial end portion of the motor stator, and wherein a tallest component in the controller is disposed in a portion surrounded by the motor stator on the motor rotor side surface of the substrate.

Since the electric pump unit is configured such that the motor shaft is cantilevered so as to be supported at one axial location by the bearing unit and the motor rotor is provided so as to surround the outer circumference of the bearing unit, the length of the motor shaft can be kept short and hence can be made compact further in size. In addition, since the motor shaft is cantilevered so as to be supported at the one axial location by the bearing unit, it is unnecessary to provide the wall which is provided to allow one of the bearings provided at the two locations on the motor shaft of the conventional electric pump unit to be provided thereon. Thus, with the substrate for the controller fixed to an end portion of the motor stator, components which are tall in height can be disposed on the motor rotor side surface of the substrate. Because of this, there is almost no such situation that the length of the electric pump unit is increased due to the controller, thereby making it possible to make the electric pump unit very compact. In addition, the axial position of the center of gravity of the rotary portion preferably exists at a central portion of an axial range of the bearing unit.

In the electric pump unit according to yet another aspect of the invention, for example, the motor stator may include: a core fixedly provided on the unit housing; a synthetic resin insulator incorporated in the core; and a coil which is wound round the insulator, and the substrate for the controller may be fixed to an end portion of the insulator.

In the electric pump unit according to yet another aspect of the invention, for example, the unit housing may include a cylindrical motor housing and a pump housing coupled to the other end of the motor housing, a small diameter cylindrical portion may be formed on the pump housing so as to extend into an inside of the motor housing, the bearing unit may be provided inside the cylindrical portion, and the motor stator may be provided on an inner circumference of the motor housing.

In this case, the bearing unit can be supported by only the cylindrical portion formed integrally on the pump housing, and hence, no other member to support the bearing unit is necessary. Because of this, a further reduction in the number of components is possible, whereby a further reduction in weight and cost is possible.

In the electric pump unit according to yet another aspect of the invention, for example, the bearing unit may include two rolling bearings situated adjacent to each other in the axial direction.

In this case, the rotary portion can be supported in a stable fashion by the two rolling bearings, and the service life of the rolling bearings can be extended. The axial position of the center of gravity of the rotary portion preferably exists between the two rolling bearings.

In the electric pump unit according to yet another aspect of the invention, for example, the bearing unit may include a single needle roller bearing.

Since the needle roller bearing has a certain length in the axial direction, the needle roller bearing can support the rotary portion stably. The axial position of the center of gravity of the rotary portion preferably exists at a central portion of the needle roller bearing.

Advantages of the Invention

According to the electric pump unit of the invention, as has been described above, the electric pump unit can be made more compact.

In addition, the weight and cost of the electric pump unit can be reduced further.

MODE FOR CARRYING OUT THE INVENTION

Figure 1:
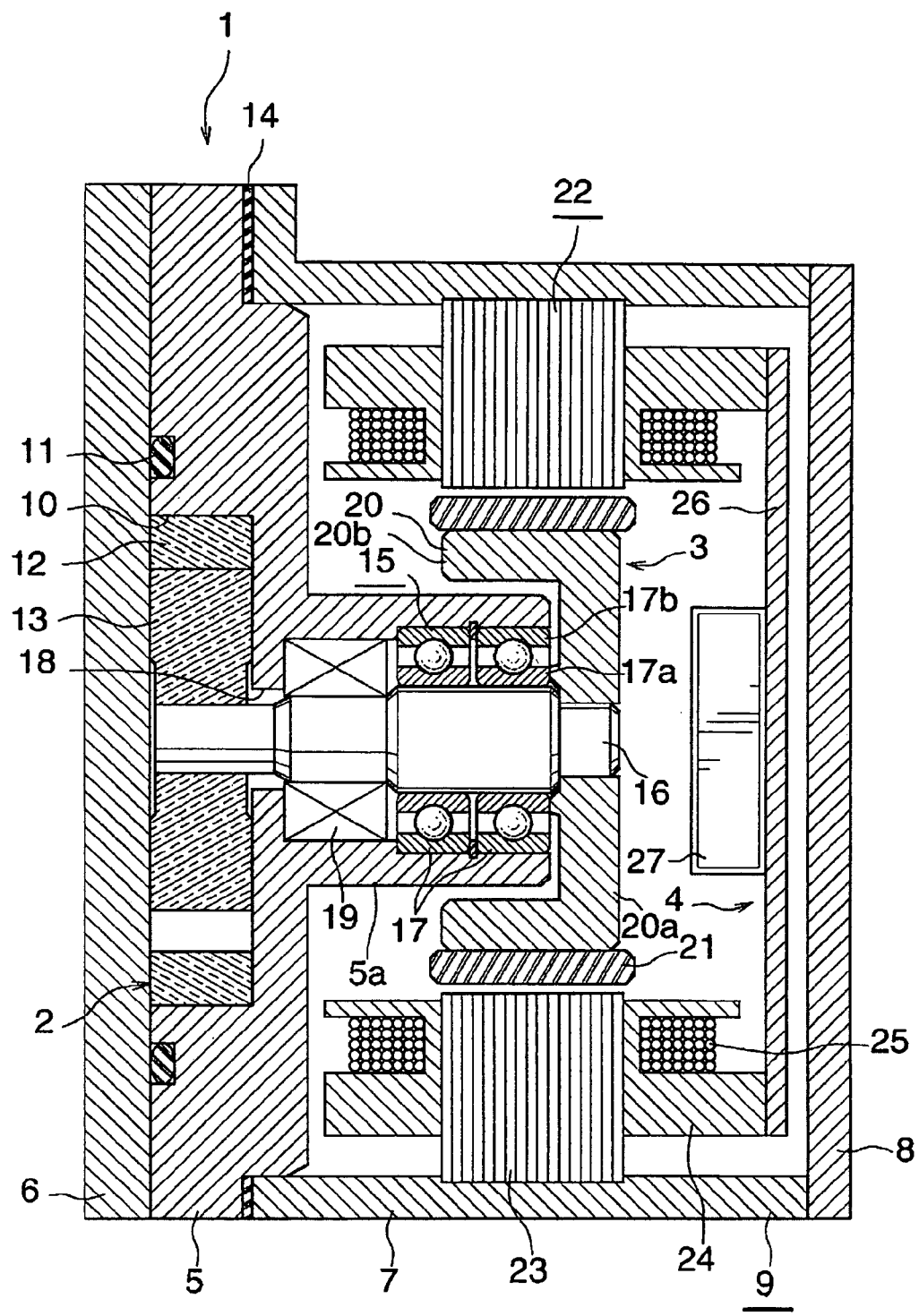
FIG. 1 is a vertical sectional view of an electric pump unit depicting a first embodiment of the invention.

Hereinafter, referring to the drawings, the invention will be described by reference to some embodiments in which the invention is applied to an automotive hydraulic pump. In the following description, a right-hand side of the drawings is referred to as a rear of an electric pump unit which is one axial end side thereof, and a left-hand side thereof is referred to as a front of the electric pump unit which is the other axial end side thereof. These embodiments depict electric pump units which are made more compact according to the invention.

First Embodiment

FIG. 1 is a vertical sectional view of an electric pump unit depicting a first embodiment of the invention.

An electric pump unit is such that a pump (2) and an electric motor (3) which rotationally drives the pump (2) are integrally incorporated within a pump housing (1). In this embodiment, a controller (4) for the motor (3) is also incorporated in the housing (1). In this embodiment, the pump (2) is a trochoidal pump, and the motor (3) is a DC brushless sensor-free motor having three-phase windings.

The unit housing (1) includes a pump housing (5), a pump plate (6), a motor housing (7) and a lid (8), and a waterproof housing (9) is configured by the pump housing (5), the motor housing (7) and the lid (8).

The pump housing (5) is a thick plate-like member which extends in a direction which is at right angles to a front to back direction, and a pump compartment (10), which is opened at a front portion thereof, is formed in the center of the pump housing (5). The pump plate (6) is fixed to a front surface of the pump housing (5) via an O-ring, and a front surface of the pump chamber (10) is closed. An outer gear (12), which makes up the pump (2), is accommodated rotatably in the pump compartment (10), and an inner gear (13), which meshes with the outer gear (12), is disposed inside the outer gear (12). Although its illustration is omitted, a fluid inlet port and a fluid outlet port are provided in the pump plate (6).

The motor housing (7) has a cylindrical shape, and a front end (the other axial end portion) of the motor housing (7) is fixed to a portion of a rear surface of the pump housing (5) which lies close to an outer circumference thereof. An opening in a rear end of the motor housing (7) is closed by the lid (8).

A cylindrical portion (5a), which is smaller in diameter than the motor housing (7), is formed integrally in the center of a rear end face of the pump housing (5). A pump driving motor shaft (16) is cantilevered so as to be supported by a bearing unit (15) which is provided at a rear portion of an interior of the cylindrical portion (5a). In this embodiment, the bearing unit (15) is made up of two rolling bearings which are ball bearings (17). An inner ring (17a) of each bearing (17) is fixed to the motor shaft (16), and an outer ring (17b) thereof is fixed to the cylindrical portion (5a). A front portion of the motor shaft (16) enters an interior of the pump compartment (10) via a hole (18) which is formed in a portion of a rear wall of the pump housing (5), and a front end of the motor shaft (16) is coupled to the inner gear (13). A seal (19) is provided between a portion inside the cylindrical portion (5a) which lies further forwards than the bearing unit (15) and the motor shaft (16).

A motor rotor (20), which makes up the motor (3), is fixedly fitted on a rear end portion of the motor shaft (16) which protrudes further rearwards than the cylindrical portion (5a). The rotor (20) is a cylindrical member which extends radially from a rear end (one axial end) of the motor shaft (16) and surrounds an outer circumference of the bearing unit (15), and a permanent magnet (21) is provided on an outer circumference thereof. An axial position of a center of gravity of a rotary portion which includes the motor shaft (16), the rotor (20) and the inner gear (13) of the pump (2) falls within an axial range of the bearing unit (15). In this embodiment, the axial position of the center of gravity exists between the two ball bearings (17) which make up the bearing unit (15). The motor rotor (20) is made up of a disc portion (20a) which lies at a rear thereof and extends radially outwards from the rear end (the one axial end portion) of the rotor shaft and a cylindrical portion (20b) which extends to the front (the other axial end portion side) from the disc portion (20a) so as to surround the outer circumference of the bearing unit (15). An inner circumference of the disc portion (20a) is fixed to the motor shaft (16), and the permanent magnet (21) is provided on an outer circumference of the cylindrical portion (20b). A rear end face (one axial end face) of the disc portion (20a) of the motor rotor (20) and a rear end face (one axial end face) of the motor shaft (16) are present substantially on the same plane.

A motor stator (22), which makes up the motor (3), is fixedly provided on a portion of an inner circumference of the motor housing (7) which confronts the rotor (20). The stator (22) is such that an insulator (a synthetic resin insulator) (24) is incorporated in a core (23) made up of a stack of steel plates and coils 25 are wound round portions of the insulator (24). In this embodiment, the stator (22) is fixed to the inner circumference of the motor housing (7) with an appropriate means such as an adhesive.

The insulator (24) protrudes further rearwards (towards the one axial end side) than the motor rotor (20). A substrate (26) for the controller (4) is fixed to a rear end (one axial end portion) of the insulator (24), and a component (27) which makes up the controller (4) is packaged on a front surface of the substrate (26).

Since this electric pump unit is constructed so that the motor shaft (16) is supported at one axial location (lying further towards the other axial end side than the portion where the motor rotor is cantilevered so as to be supported (one axial end portion) by the bearing unit (15) and the motor rotor (20) is provided so as to surround the outer circumference of the bearing unit (15), the length of the motor shaft (16) can be kept short and hence, the electric pump unit can be made more compact. In addition, since the axial position of the center of gravity of the rotary portion which includes the motor shaft (16), the motor rotor (20) and the inner gear (13) of the pump (2) falls within the axial range of the bearing unit (15), the rotary portion can be supported rotatably in a stable fashion. Further, since the axial position of the center of gravity exists between the two ball bearings (17) which make up the bearing unit (15), the rotary portion can be supported rotatably in a stabler fashion. In addition, since the bearing unit (15) can be supported by only the cylindrical portion (5a) which is formed integrally on the pump housing (5), no other member for supporting the bearing unit (15) is necessary. Because of this, a further reduction in the number of components is possible, thereby making it possible to reduce further the weight and cost of the electric pump unit.

Second Embodiment

Figure 2:
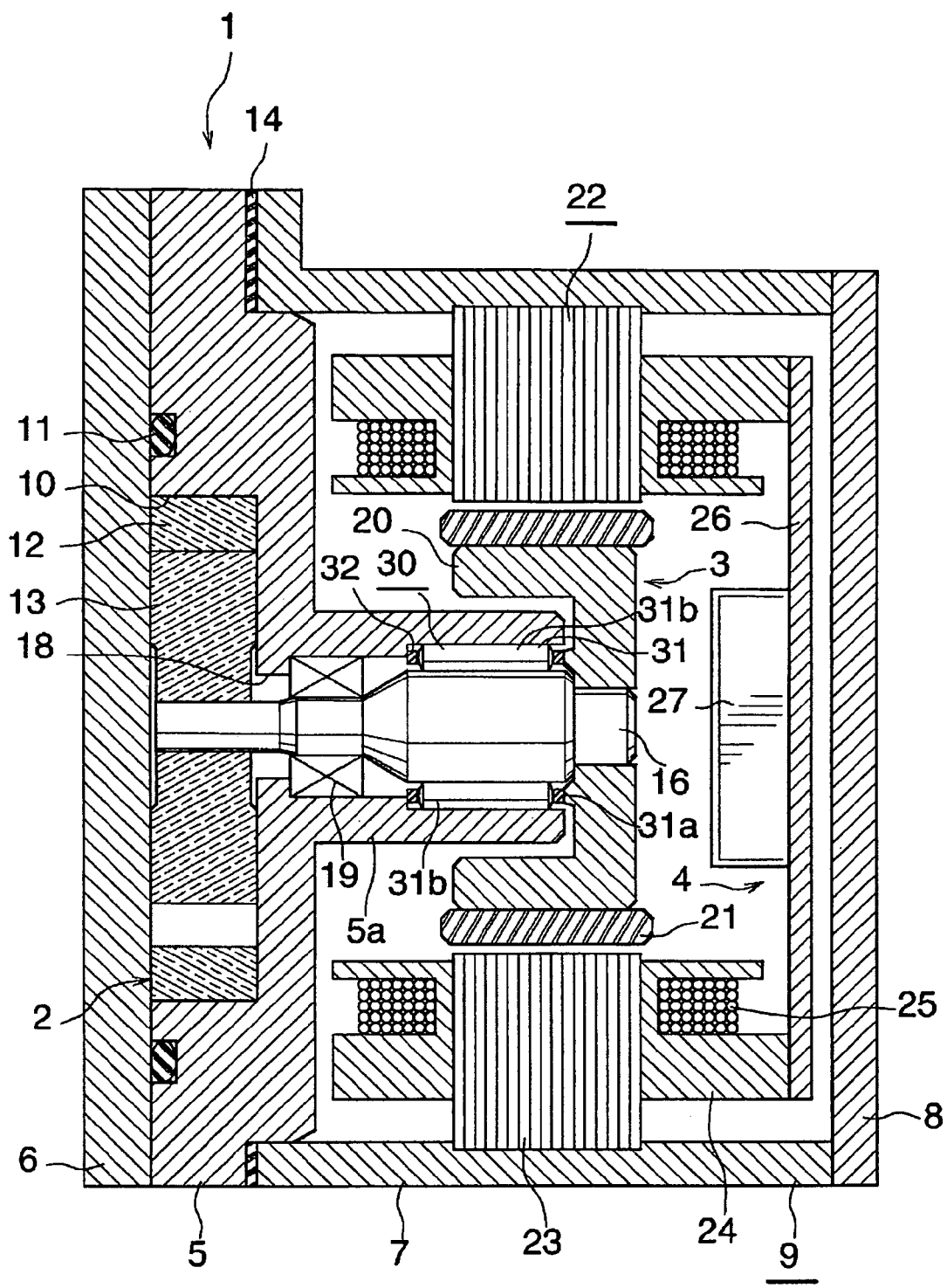
FIG. 2 is a vertical sectional view of an electric pump unit depicting a second embodiment of the invention.

FIG. 2 is a vertical sectional view of an electric pump which depicts a second embodiment of the invention.

A second embodiment has a similar configuration to that of the first embodiment excluding a bearing unit (30). In FIG. 2, like reference numerals will be given to like portions to those of the first embodiment.

In the second embodiment, a bearing unit 830) is made up of a single needle roller bearing (31). In this embodiment, the bearing unit (30) is a needle roller bearing with a cage which includes a cage (31a) and a plurality of needle rollers (31b) which are supported by the cage (31a). The rollers (31b) roll while being held between an outer circumferential surface of a motor shaft (16) and a cylindrical portion (5a). An axial position of the bearing (31) is restricted by front and rear end faces of the cage (31a) being brought into abutment with a rearward annular end face (32) formed on an inner circumference of the cylindrical portion and a front surface of a portion (a disc portion) of a rotor (20) which extends radially outwards. An axial position of a center of gravity of a rotary portion which includes the rotor shaft (16), the rotor (20) and an inner gear (13) of a pump (2) falls within an axial range of the bearing unit (30). In this embodiment, the axial position of the center of gravity exists at a central portion of an axial length of the needle roller bearing (31) which makes up the bearing unit (30).

In the case of the second embodiment, since the needle roller bearing (31) has a certain length in the axial direction, the needle roller bearing (31) can support the rotary portion in a stable fashion. In addition, the bearing unit (30) is not limited to the needle roller bearing (31), and even in the event that the bearing unit (30) is made up of a cylindrical roller bearing which has a certain length in the axial direction, a similar advantage can be provided.

Third Embodiment

Figure 3:
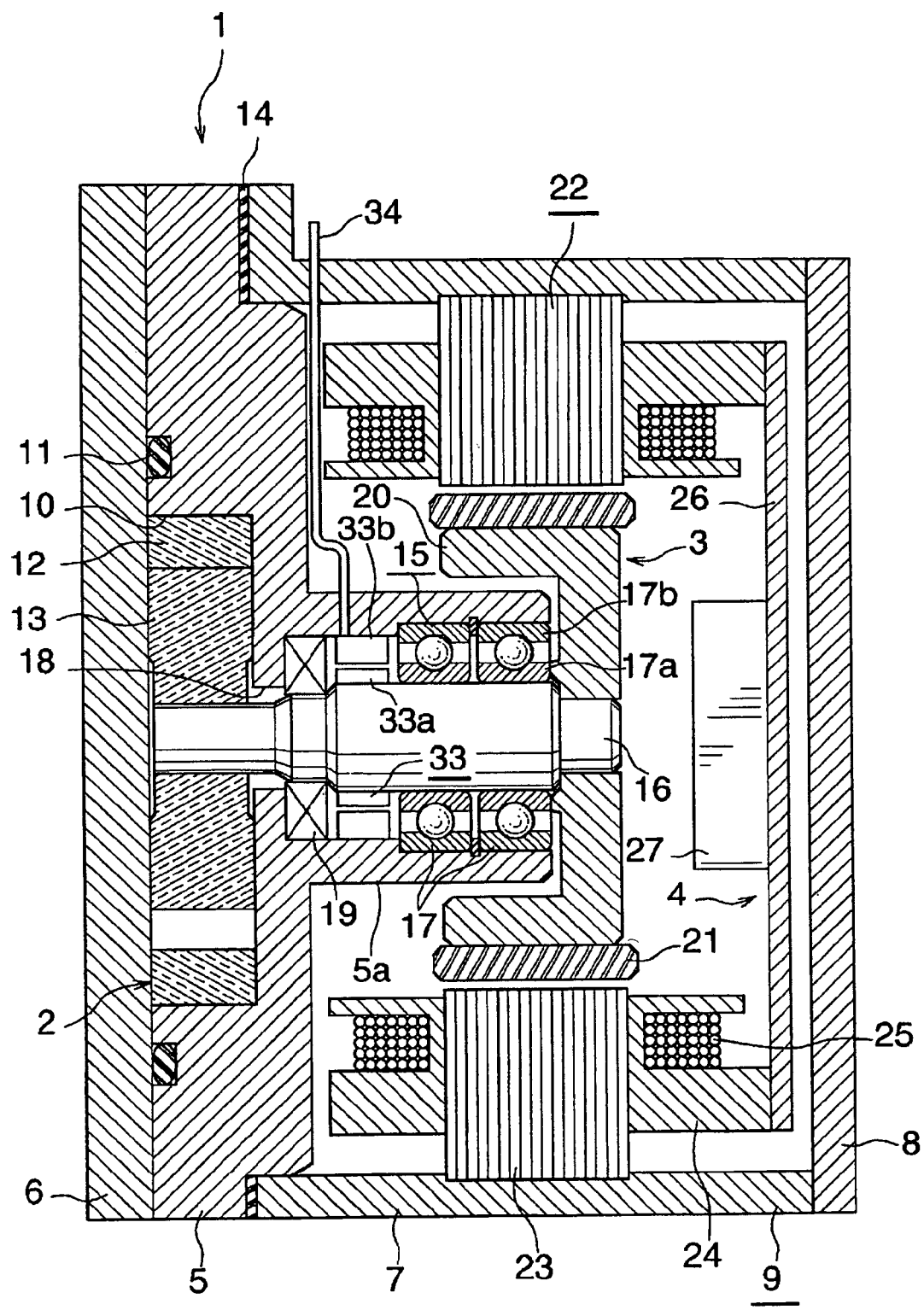
FIG. 3 is a vertical sectional view of an electric pump unit depicting a third embodiment of the invention.

FIG. 3 is a vertical sectional view of an electric pump unit which depicts a third embodiment of the invention.

A third embodiment is such that a rotation angle (a rotational position) of a motor shaft (16) is detected by a rotation angle sensor (33) for control, and excluding this, the third embodiment has a similar configuration to that of the first embodiment. In FIG. 3, like reference numerals will be given to like portions to those of the first embodiment.

The rotation angle sensor (33) is provided within a unit housing (1). The rotation angle sensor (33) is made up of a rotor (33a) and a stator (33b) and is a resolver in this embodiment. The sensor rotor (33a) is provided on an outer circumference of the motor shaft (16) which lies further radially inwards than a cylindrical motor rotor (20), and the sensor stator (33b) is provided at a portion on the unit housing (1) which confronts the sensor rotor (33a). In this embodiment, the sensor rotor (33a) is provided on a portion of the outer circumference of the motor shaft (16) which lies between a bearing unit (15) and a seal (19), and the sensor stator (33b) is provided on a portion on an inner circumference of a cylindrical portion (5a) of a pump housing (5) which confronts the sensor rotor (33a). An electric wire 34 connected to the sensor stator (33b) is led to the outside from a portion of a motor housing (7).

In the case of the third embodiment, the electric motor can be controlled by detecting the rotation angle of the motor shaft (16) by the rotation angle sensor (33), and by the rotor (33a) and the stator (33b) of the rotation angle sensor (33) confronting each other in the radial direction, an increase in axial length of the electric pump unit can be suppressed, thereby making it possible to make small the electric pump unit in size.

Fourth Embodiment

Figure 4:
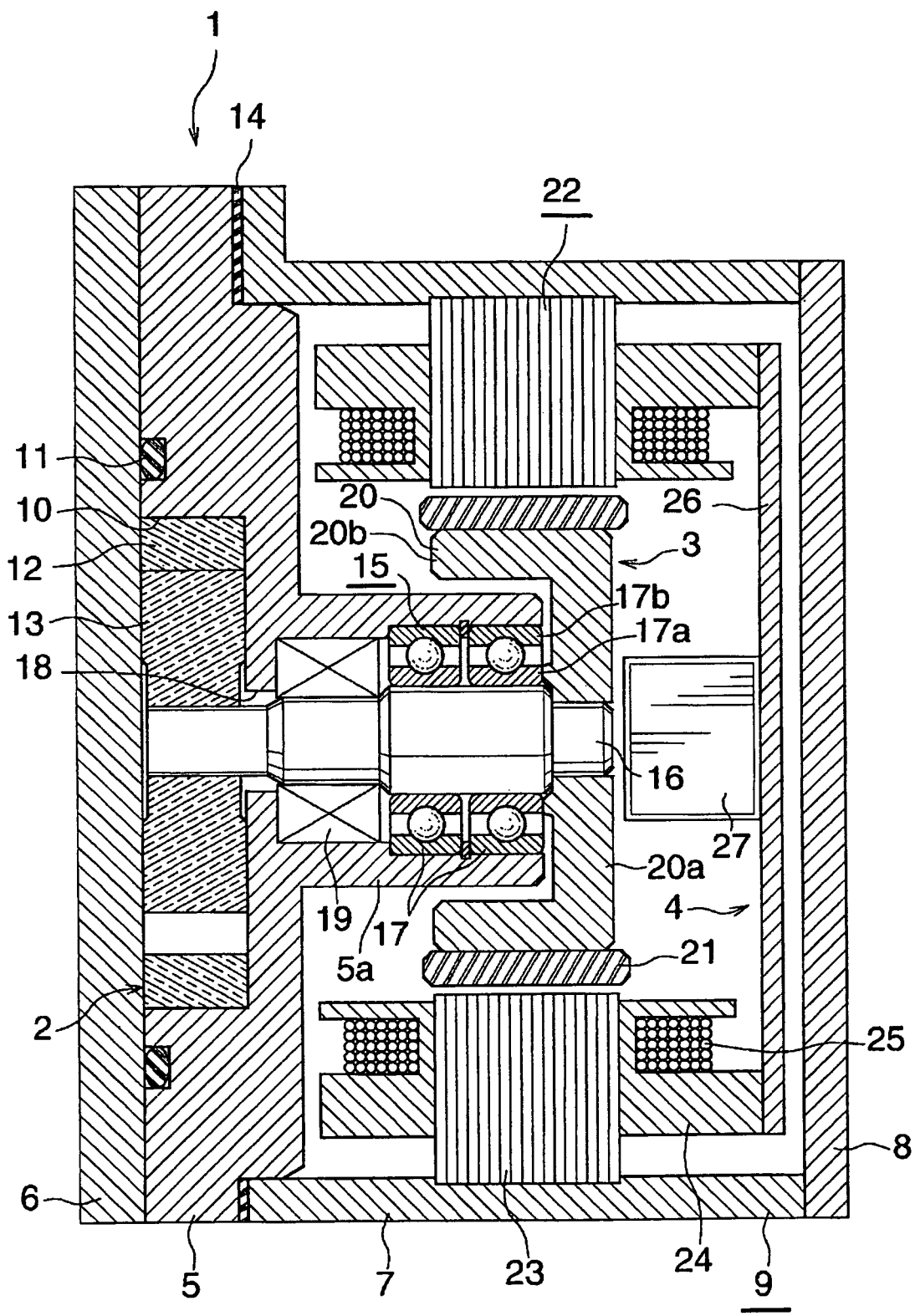
FIG. 4 is a vertical sectional view of an electric pump unit depicting a fourth embodiment of the invention.

FIG. 4 is a vertical sectional view of an electric pump unit which depicts a fourth embodiment of the invention.

In this invention, a motor rotor (16) is cantilevered so as to be supported by a bearing unit (15) at one axial location thereon which lies further towards the other axial end side than a portion (one axial end side) where a motor rotor (20) is supported, and therefore, the wall is unnecessary which is provided to allow one of the two bearings of the conventional electric pump unit to be provided thereon. Because of this, a substrate (26) for a controller (4) can be fixed to one axial end portion of an insulator (24) of a motor stator (22), so that a component (27) which is tall in height can be disposed on a motor rotor (20) side surface of the substrate (26). Because of this, there is almost no such situation that the length of the electric pump unit is increased due to the controller (4), thereby making it possible to make the electric pump unit very compact in size.

Except for this point, the fourth embodiment has a similar configuration to that of the first embodiment. In FIG. 4, like reference numerals will be given to like portions to those of the first embodiment.

In the fourth embodiment, the insulator (24) protrudes further rearwards (towards one axial end side) than the motor rotor (20). The substrate (26) for the controller (4) is fixed to a rear end (one axial end portion) of the insulator (24), and a component (27) making up the controller (4) which is the tallest in height such as a capacitor is packaged on a front surface of the substrate (26), that is, a motor rotor (20) side surface of the substrate (26) so as to be positioned within a space surrounded by the insulator (24) and a disc portion (20g) of the rotor (20). Although its illustration is omitted, a component making up the controller (4) which is relatively short in height is also disposed on the front surface of the substrate (26). In addition, a component making up the controller (4) which is relatively short in height can be disposed in an arbitrary position on the front surface or a rear surface of the substrate (26).

Since this electric pump unit is constructed so that the motor rotor (16) is cantilevered so as to be supported by the bearing unit (15) at the one axial location thereon which lies further towards the other axial end side than the portion (the one axial end side) where the motor rotor (20) is supported and the rotor (20) is provided so as to surround an outer circumference of the bearing unit (15), the axial length of the motor shaft (16) can be kept short, and the electric pump unit can be made more compact in size. In addition, an axial position of a center of gravity of a rotary portion which includes the motor shaft (16), the motor rotor (20) and an inner gear (13) of a pump (2) falls within an axial range of the bearing unit (15), whereby the rotary portion can be supported rotatably in a stable fashion. Further, since the axial position of the center of gravity exists between two roller bearings (17) which make up the bearing unit (15), the rotary portion can be supported rotatably in a more stable fashion. In addition, the bearing unit (15) can be supported by only a cylindrical portion (5a) which is formed integrally on a pump housing (5), and hence, no other member for supporting the bearing unit (15) is necessary. Because of this, a further reduction in the number of components is possible, and a further reduction in weight and cost of the electric pump unit is possible.

In addition, since the motor rotor (16) is cantilevered so as to be supported by the bearing unit (15) at the one axial location thereon which lies further towards the other axial end side than the portion (the one axial end side) where the motor rotor (20) is supported, the wall is unnecessary which is provided to allow one of the two bearings of the conventional electric pump unit to be provided thereon. In addition, the substrate (26) for the controller (4) can be fixed to the one axial end portion of the insulator (24) of the motor stator (22), so that the component (27) which is tall in height can be disposed on the motor rotor (20) side surface of the substrate (26). Because of this, there is almost no such situation that the length of the electric pump unit is increased due to the controller (4), thereby making it possible to make the electric pump unit very compact in size.

The overall configuration of the electric pump unit and configurations of the constituent portions thereof are not limited to those described in the embodiments and hence can be altered as required.

For example, while the bearing unit is made up of the rolling bearing or bearings in the first to fourth embodiments, the bearing unit may be made up of a sliding bearing.

In addition, the invention can also be applied to other electric pump units than the automotive electric pump unit.

Description of Reference Numerals (1) unit housing; (5) pump housing; (5a) cylindrical portion; (7) motor housing; (15), (30) bearing unit; (16) motor shaft; (17) ball bearing; (20) motor rotor; (22) motor stator; (31) needle roller bearing; (33) rotation angle sensor; (33a) rotor; (33b) stator.

The invention claimed is:

1. An electric pump unit comprising:
   a unit housing;
   a bearing unit provided within the unit housing;
   a rotary portion comprising:
      a pump driving motor shaft supported by the bearing unit such that an axial position of a center of gravity of the rotary portion falls within an axial range of the bearing unit; and
      a motor rotor comprising:
         a disc portion which extends radially outwards from an axial end portion of the motor shaft; and
         a cylindrical portion which extends from an outer circumferential portion of the disc portion towards an other axial end portion of the motor shaft and surrounds an outer circumference of the bearing unit; and
   a motor stator fixed to the unit housing,
   wherein a small diameter cylindrical portion is formed on the unit housing so as to extend into an inside of the unit housing,
   wherein a portion of the bearing unit is provided inside the small diameter cylindrical portion,
   wherein the unit housing comprises:

a cylindrical motor housing; and
a pump housing coupled to an end of the motor housing,
wherein the small diameter cylindrical portion is formed on the pump housing so as to extend into an inside of the motor housing, and
wherein the motor stator is provided on an inner circumference of the motor housing.

2. An electric pump unit comprising:
a unit housing;
a bearing unit provided within the unit housing;
a rotary portion comprising:
   a pump driving motor shaft supported by the bearing unit such that an axial position of a center of gravity of the rotary portion falls within an axial range of the bearing unit; and
   a motor rotor comprising:
      a disc portion which extends radially outwards from an axial end portion of the motor shaft; and
      a cylindrical portion which extends from an outer circumferential portion of the disc portion towards an other axial end portion of the motor shaft and surrounds an outer circumference of the bearing unit; and
a motor stator fixed to the unit housing,
wherein the bearing unit comprises two rolling bearings situated adjacent to each other in the axial direction.

3. The electric pump unit according to claim 1,
wherein the bearing unit comprises a single needle roller bearing.

4. An electric pump unit comprising:
a unit housing;
a bearing unit provided within the unit housing;
a rotary portion comprising:
   a pump driving motor shaft supported by the bearing unit such that an axial position of a center of gravity of the rotary portion falls within an axial range of the bearing unit; and
   a motor rotor comprising:
      a disc portion which extends radially outwards from an axial end portion of the motor shaft; and
      a cylindrical portion which extends from an outer circumferential portion of the disc portion towards an other axial end portion of the motor shaft and surrounds an outer circumference of the bearing unit; and
a motor stator fixed to the unit housing,
wherein a rotor of a rotation angle sensor is provided on an outer circumference of the motor shaft situated further radially inwards than the cylindrical motor rotor, and
wherein a stator of the rotation angle sensor is provided on a portion of the unit housing which faces the rotor of the rotation angle sensor.

5. The electric pump unit according to claim 1,
wherein a rotor of a rotation angle sensor is provided on art outer circumference of the motor shaft situated further radially inwards than the motor rotor, and
wherein a stator of the rotation angle sensor is provided on an inner circumference of the cylindrical portion which faces the rotor of the rotation angle sensor.

6. An electric pump unit comprising:
a unit housing;
a bearing unit provided within the unit housing;
a rotary portion comprising:
   a pump driving motor shaft supported by the bearing unit such that an axial position of a center of gravity of the rotary portion falls within an axial range of the bearing unit; and
   a motor rotor comprising:
      a disc portion which extends radially outwards from an axial end portion of the motor shaft; and
      a cylindrical portion which extends from an outer circumferential portion of the disc portion towards an other axial end portion of the motor shaft and surrounds an outer circumference of the bearing unit; and
a motor stator fixed to the unit housing,
wherein the motor stator protrudes further towards one axial end side than the motor rotor,
wherein a substrate for a controller is fixed to one axial end portion of the motor stator, and
wherein a tallest component in the controller is disposed in a portion surrounded by the motor stator on the motor rotor side surface of the substrate.

7. The electric pump unit according to claim 6,
wherein the motor stator comprises:
   a core fixedly provided on the unit housing;
   a synthetic resin insulator incorporated in the core; and
   a coil which is wound round the insulator, and
wherein the substrate for the controller is fixed to an axial end portion of the insulator.

8. The electric pump unit according to claim 1, wherein the small diameter cylindrical portion extends from an end face of the pump.

9. The electric pump unit according to claim 1, wherein the small diameter cylindrical portion is integrally formed in a center of an end face of the pump.

* * * * *